(12) United States Patent
Wen et al.

(10) Patent No.: US 9,120,408 B2
(45) Date of Patent: Sep. 1, 2015

(54) VEHICLE DISPLAY SYSTEM

(71) Applicants: Michael Tai-Hao Wen, Taipei (TW); Chen-Hung Tai, Taipei (TW)

(72) Inventors: Michael Tai-Hao Wen, Taipei (TW); Chen-Hung Tai, Taipei (TW)

(73) Assignee: JET OPTOELECTRONICS CO., LTD., Taipei (TW)

( * ) Notice: Subject to any disclaimer, the term of this patent is extended or adjusted under 35 U.S.C. 154(b) by 40 days.

(21) Appl. No.: 13/625,873

(22) Filed: Sep. 25, 2012

(65) Prior Publication Data

US 2014/0084648 A1 Mar. 27, 2014

(51) Int. Cl.
| | | |
|---|---|---|
| *A47C 7/62* | (2006.01) | |
| *B60N 2/48* | (2006.01) | |
| *H05K 5/00* | (2006.01) | |
| *B29C 33/70* | (2006.01) | |
| *B05D 5/00* | (2006.01) | |
| *B60N 2/64* | (2006.01) | |
| *B29C 33/42* | (2006.01) | |
| *B60N 2/44* | (2006.01) | |

(52) U.S. Cl.
CPC .............. *B60N 2/4876* (2013.01); *B05D 5/00* (2013.01); *B29C 33/70* (2013.01); *B60N 2/64* (2013.01); *H05K 5/0017* (2013.01); *B29C 33/42* (2013.01); *B29K 2995/0022* (2013.01); *B60N 2002/4405* (2013.01)

(58) Field of Classification Search
CPC .. B60K 35/00; B60R 11/0235; B60N 2/4808; B60N 2/2876; B60N 2/4875; B60N 2/64; B60N 2002/4405; H05K 5/0017; B29C 33/70; B29C 33/42; B05D 5/00; B29K 2995/0022

USPC ................................................ 297/217.3, 391
See application file for complete search history.

(56) References Cited

U.S. PATENT DOCUMENTS

| | | | |
|---|---|---|---|
| 3,628,829 A * | 12/1971 | Heilig | ......................... 297/217.4 |
| 6,871,356 B2 | 3/2005 | Chang | |
| 7,036,879 B2 | 5/2006 | Chang | |
| 7,044,546 B2 | 5/2006 | Chang | |
| 7,267,402 B2 | 9/2007 | Chang | |
| 7,416,439 B2 | 8/2008 | Macholz | |
| 7,636,930 B2 | 12/2009 | Chang | |
| 7,791,586 B2 | 9/2010 | Shalam | |
| 7,909,396 B2 | 3/2011 | Vitito | |
| 8,203,657 B2 * | 6/2012 | Vitito | ............................ 348/837 |
| 2004/0154040 A1 | 8/2004 | Ellis | |
| 2005/0015805 A1 | 1/2005 | Iwamura | |
| 2005/0102697 A1 | 5/2005 | Vitito | |
| 2005/0125123 A1 | 6/2005 | Kageyama | |
| 2006/0128473 A1 * | 6/2006 | Vitito | ............................... 463/46 |
| 2006/0288379 A1 | 12/2006 | Vitito | |
| 2007/0040910 A1 | 2/2007 | Kuwata | |
| 2008/0203788 A1 * | 8/2008 | Hattori et al. | ............... 297/217.3 |
| 2008/0250462 A1 | 10/2008 | Crohas | |
| 2008/0252798 A1 | 10/2008 | Vitito | |
| 2009/0138920 A1 | 5/2009 | Anandpura | |
| 2009/0173455 A1 * | 7/2009 | Hartley | ......................... 160/127 |
| 2010/0005496 A1 | 1/2010 | Ellis | |

(Continued)

*Primary Examiner* — Philip Gabler
(74) *Attorney, Agent, or Firm* — Gokalp Bayramoglu

(57) ABSTRACT

The present invention discloses a monitor, comprising a housing, a screen, a button zone and some circuits inside the housing. Side and rear portions of the screen are wrapped by the housing, and its front portion is exposed outside to display images. The button zone includes a plurality of functional buttons that assist users to input instructions and select functions. The housing is treated with gloss finish so that it has a lustrous appearance and looks shiny.

14 Claims, 8 Drawing Sheets

(56) References Cited

U.S. PATENT DOCUMENTS

| | | |
|---|---|---|
| 2010/0253597 A1 | 10/2010 | Seder et al. |
| 2010/0302138 A1 | 12/2010 | Poot et al. |
| 2010/0304349 A1 | 12/2010 | Kunin |
| 2011/0237324 A1 | 9/2011 | Clavin et al. |
| 2012/0086247 A1 | 4/2012 | Liu |
| 2012/0140126 A1 * | 6/2012 | Werth et al. .......... 348/837 |
| 2012/0233644 A1 | 9/2012 | Rao |

* cited by examiner

1

VEHICLE DISPLAY SYSTEM

CROSS-REFERENCE TO RELATED APPLICATION

This application claims the benefit of U.S. Provisional Application No. 61/547,143, filed Oct. 14, 2011.

BACKGROUND OF THE INVENTION

1. Field of the Invention

The invention relates to monitors.

2. Description of the Related Art

Monitor as an information display device is popularly used in our daily lives. The most common usage of monitor was for television. Now, many other output devices are used to display information, such as computer display, observing device of automatic control equipment, and others.

A typical monitor consists of electronics circuits, a screen, and a housing. The electronics circuits receive and process signals, and send them to the screen. The screen displays images based on the signals received from the electronics circuits. The housing encloses the electronics circuit and a part of the screen for protecting them from environmental effects such as water, sunshine, dust, etc., while exposing a display surface of the screen to exterior.

The screen is made of glass or other transparent materials which could transmit light out, and the housing is almost always made of plastic. The reflectivity of the screen and the housing is different from each other, which makes the appearance of the monitor look disharmony and uncomfortable especial in bright environment.

SUMMARY OF THE INVENTION

One object of the present invention is to provide a monitor with shiny housing. Another object of the present invention is to provide a seatback monitor with wide visual angle and better visual effect.

Another object of the present invention is to provide a monitor with a 3D panel. The present invention may be fully understood from the description of preferred embodiments of the invention set forth below, together with the accompanying drawings.

DETAILED DESCRIPTION OF THE INVENTION

Figure 1:
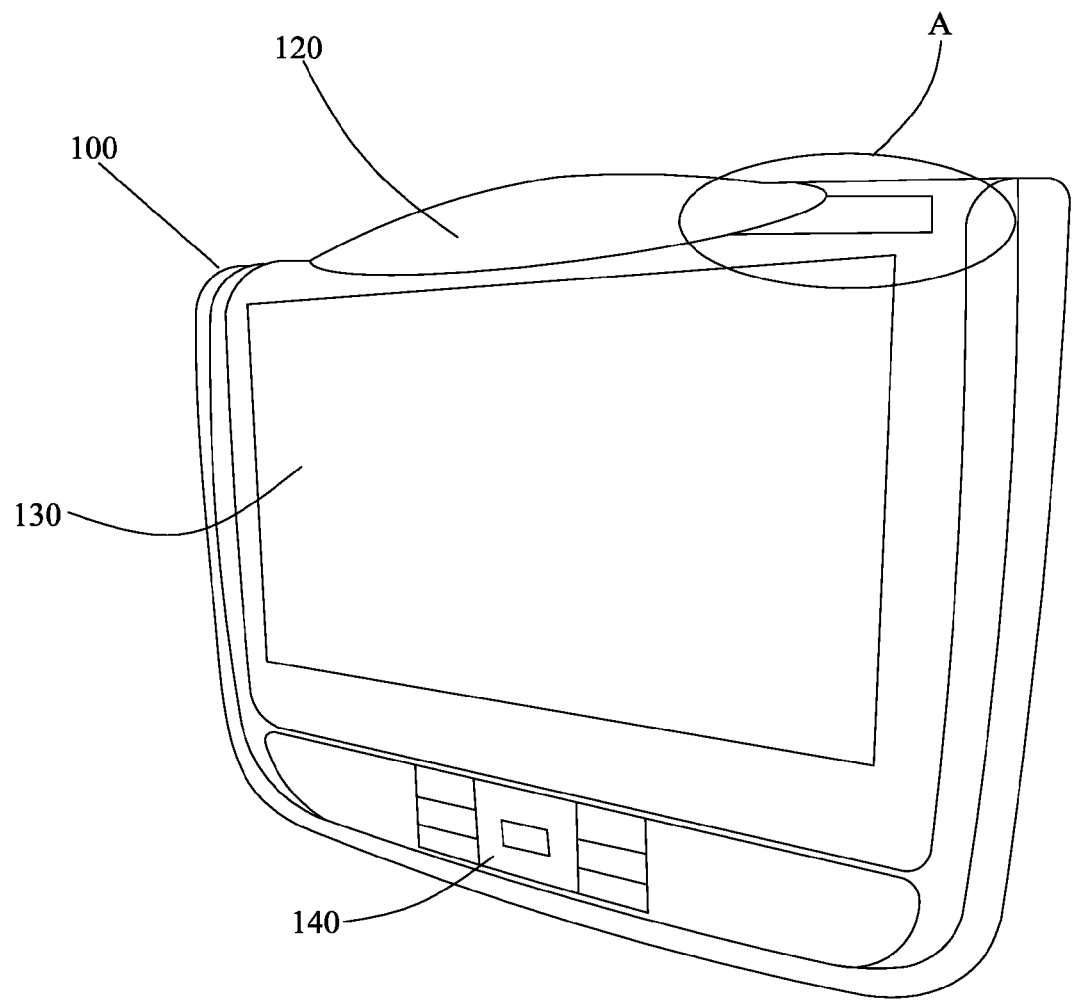
FIG. 1 shows the perspective view of the monitor of the first technical solution.

Referring to the drawings, preferred embodiments of the present invention are described below.

The present invention provides a monitor with a shiny housing.

In FIG. 1, a monitor 100 according to an embodiment includes a housing 120, a screen 130, a button zone 140, and circuits (not shown) inside the housing 120. Side and rear portions of the screen 130 are wrapped by the housing 120, and its front portion is exposed outside to display images. The button zone 140 includes a plurality of functional buttons that assist users to input instructions and select functions. In one embodiment, the button zone 140 located at the bottom of the front surface of the housing 120 and the buttons are fixed in the housing 120. Alternatively, the button zone 140 could be set in any other parts of the housing 120, and the buttons may not be there when the screen 130 is a touch panel.

The screen 130 is made of glass, while in other embodiments it may be made of polyethylene terephthalate (PET) or other transparent materials. The screen 130 has good optical character and looks lustrous and shiny.

Referring to Part A of FIG. 1, the housing 120 has a lustrous appearance and looks shiny. The housing 120 is treated with gloss finish, there are two ways to apply gloss finish on the surface of the housing 120. The gloss finish may be anywhere on the visible part of the housing 120.

Embodiment 1

Figure 2:
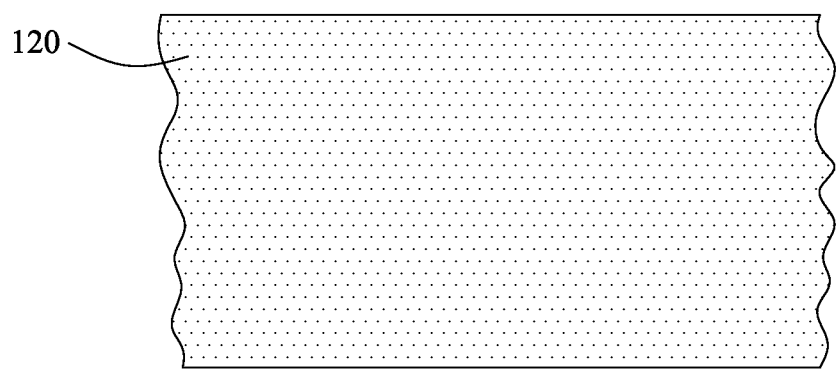
FIG. 2 shows the first embodiment of the first technical solution.

Please refer to FIG. 2, which illustrates the first way to apply gloss finish, it is usually applied for mass production, wherein a mold (not shown) is prepared; firstly polish the mold with gloss finish until the brightness level reaches 12000#, then inject high gloss resin in the mold. In this embodiment, the material of the gloss finish is similar with the material of the high gloss resin, therefore the shiny housing 120 is formed.

Embodiment 2

Figure 3:
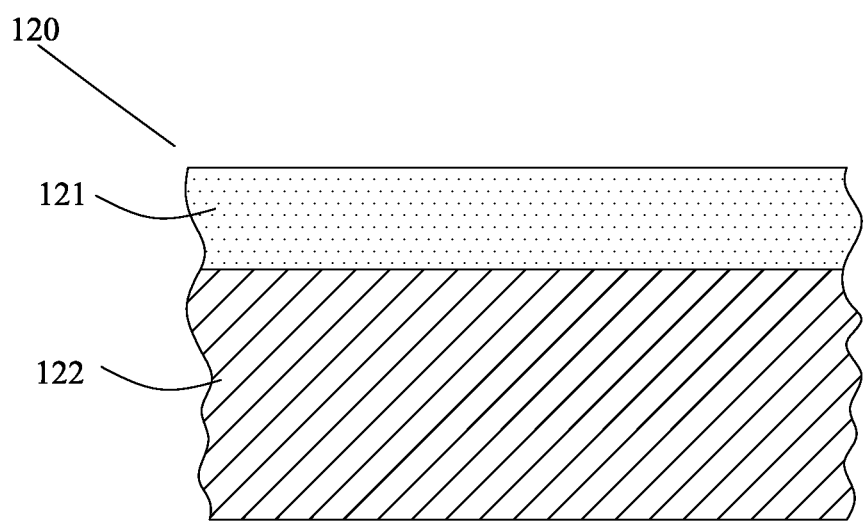
FIG. 3 shows the second embodiment of the first technical solution.

Please refer to FIG. 3, which illustrates the second way of applying gloss finish. It is usually applied on mock-up samples; in this embodiment, the housing 120 comprises a coating 121 and a surface 122, wherein said coating 121 is wholly applied on said surface 122 by painting or other manners, the thickness of said coating 121 ranges from 0 to 0.1 mm therefore the housing 120 with lustrous appearance is formed.

The present invention further provides a seatback monitor with a wide visual angle.

Embodiment 1

Figure 4:
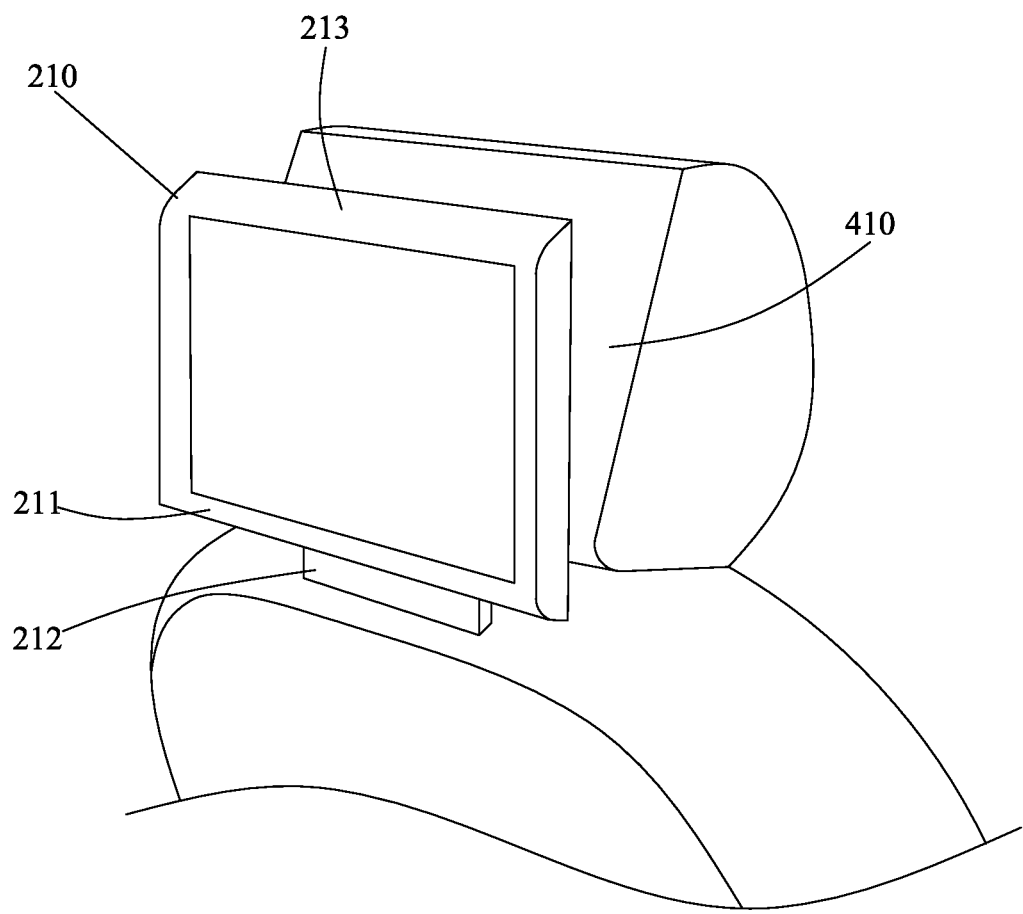
FIG. 4 shows the first embodiment of the second technical solution.

In FIG. 4, a monitor 210 is installed on a seatback 410, a fixing seat 212 is set on the bottom side 211 of the monitor 210, so the bottom side 211 is fixed on the seatback 410 through said fixing seat 212 and acts as the rotating axis of the monitor 210, so the top side 213 of the monitor 210 could rotate around the bottom side 211, such that the user could freely adjust the visual angel by rotating the monitor 210.

Embodiment 2

Figure 5:
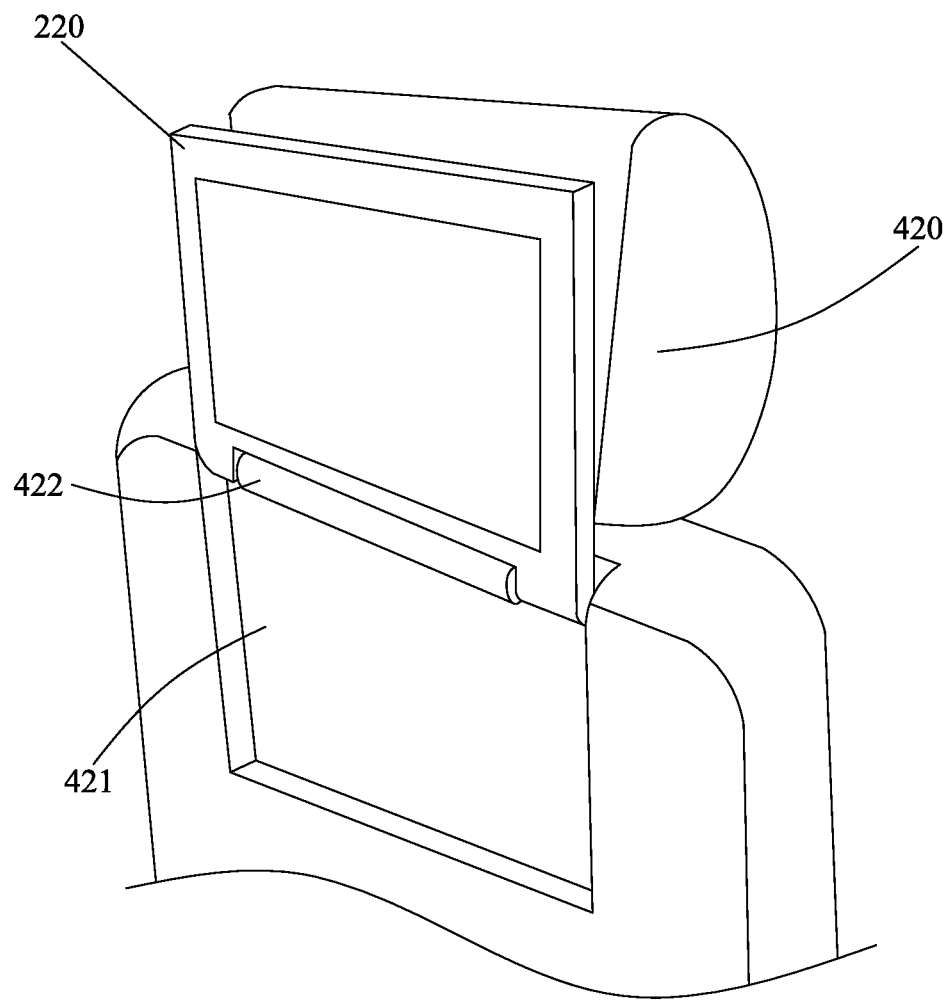
FIG. 5 shows the second embodiment of the second technical solution.

In FIG. 5, a monitor 220 is installed on a seatback 420, the seatback 420 has a containing groove 421 on its lower portion, the shape of said containing groove 421 is adapted to the monitor 220, a protruding strip 422 is integrated on the top of the containing groove 421, the bottom of the monitor 220 is connected with the protruding strip 422 so that the monitor 220 could rotate around the protruding strip 422, therefore the user could selectively open the monitor 220 with different rotating angle or close it ending in the containing groove 421.

Embodiment 3

Figure 6:
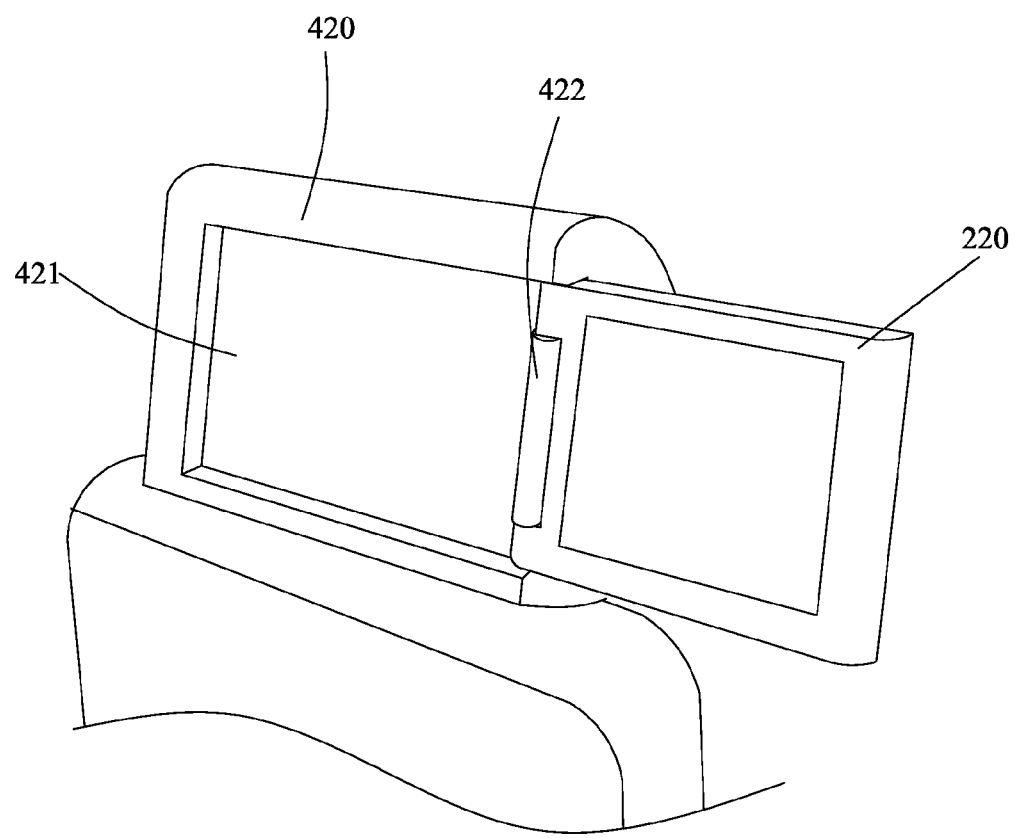
FIG. 6 shows the third embodiment of the second technical solution.

Alternatively, the rotating direction could also be perpendicular to the rotating direction of FIG. 5, please refer to FIG. 6, the left edge of the monitor 220 could act as the rotating axis of the monitor 220, so the monitor 220 could be opened or closed by the same principle of FIG. 5.

Embodiment 4

Figure 7:
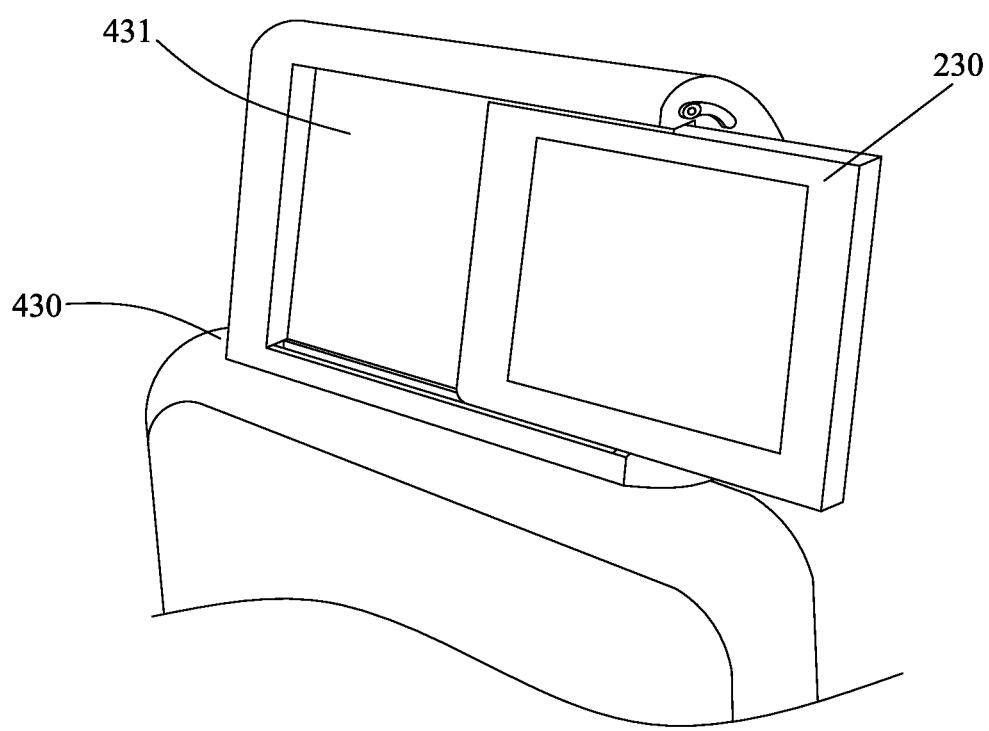
FIG. 7 shows the fourth embodiment of the second technical solution.

Please refer to FIG. 7, a monitor 230 is installed on a seatback 430, the seatback 430 has a containing groove 431 on its upper portion, the shape of said containing groove 431 is adapted to the monitor 230, so the monitor 230 could slide along the containing groove 431 horizontally or ending in said containing groove 431; and the user could adjust the visual angle by horizontally sliding the monitor 230. Alternatively, the monitor 230 could be designed to slide along the containing groove 431 vertically; the visual angle could be adjusted according to the same principle.

Alternatively, the monitor 210, 220 and 230 could stand on table or can be installed on wall.

Figure 8:
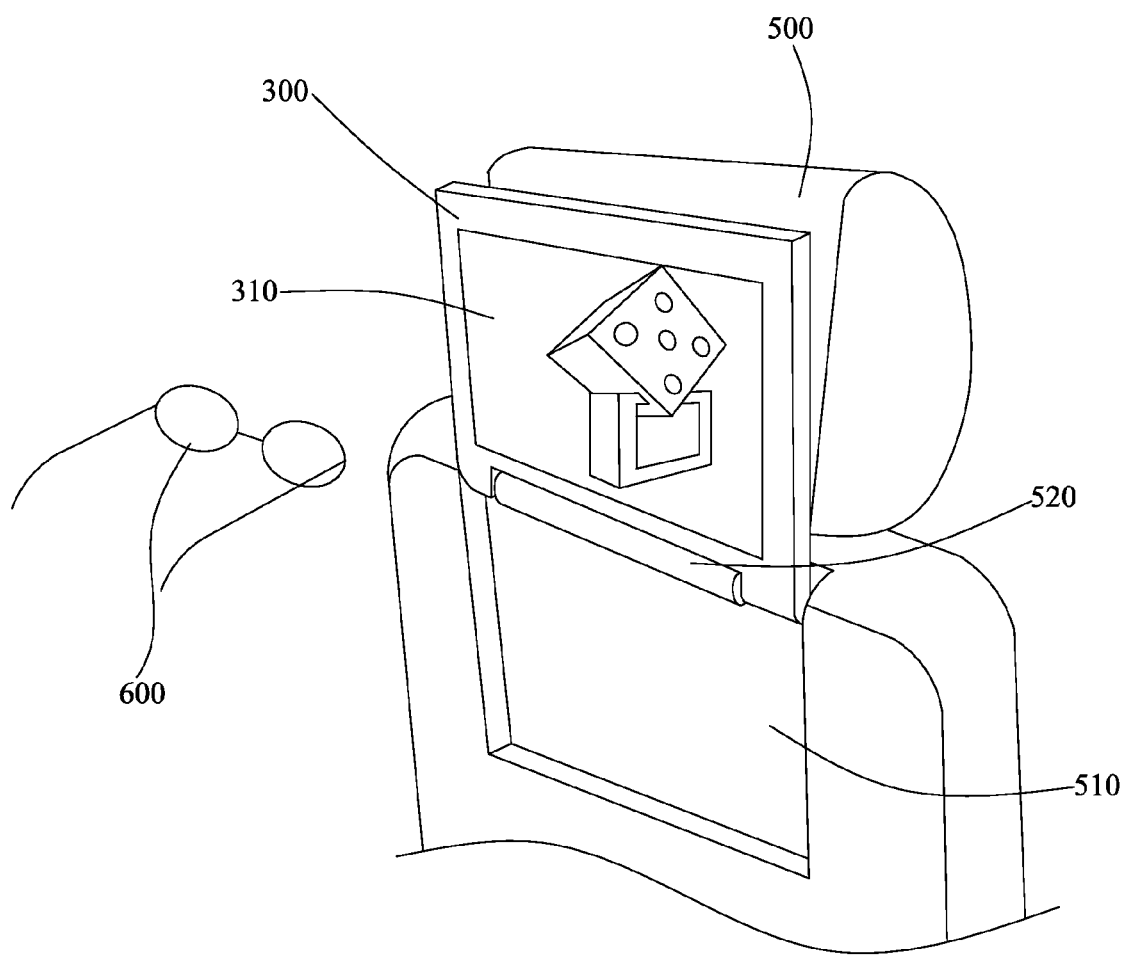
FIG. 8 shows the monitor with 3D panel of the third technical solution.

In FIG. 8, the present invention further provides a monitor 300 with a 3D panel 310, said monitor 300 is set on a seatback 500, and the seatback 500 has a containing groove 510 which is adapted to the monitor 300. A protruding strip 520 is formed on the top of the containing groove 510 and acts as the rotating axis of the monitor 300, the bottom of the monitor 300 is connected with the protruding strip 520, therefore the principle of opening and closing the monitor 300 is the same as FIG. 5; the monitor 300 has a 3D panel 310, such that the user could enjoy 3D visual effects with a pair of 3D glasses 600.

Concluding from the above description, since the housing of the present invention is treated with gloss finish, so the appearance of the monitor will look harmonious and comfortable in bright environment, such a monitor with pleasant appearance will gain great popularity from the consumers.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A vehicle display system comprising:
a monitor device;
a vehicle headrest;
wherein the monitor device is installed in the vehicle headrest;
wherein the vehicle headrest comprises a containing groove and the shape of the containing groove is adapted to the monitor device; and
wherein the monitor device is adjustable for changing the visual angle;
wherein the monitor device further comprising: a housing, a screen, a button zone, and a plurality of circuits inside the housing; wherein side and rear portions of the screen are wrapped by the housing; wherein the front portion of the monitor device is exposed outside; and the button zone includes a plurality of functional buttons that assists users to input instructions and select functions;
wherein the housing is treated with a gloss finish to create a shiny housing such that a polishing value is approximately #12,000 grit;
wherein no buttons are present in the button zone when the screen has a touch panel functionality.

2. The monitor device of claim 1 wherein the button zone is located at the bottom of the front surface of the housing and the buttons are fixed in the housing.

3. The monitor device of claim 1 wherein the button zone is located on an other part of the housing that the user can interface with.

4. The monitor device of claim 1 wherein the gloss finish may be anywhere on the visible part of the housing.

5. The monitor device of claim 1 wherein the screen material is selected from a group consisting of glass, polyethylene terephthalate (PET) and any other transparent material.

6. A monitor device comprising: a housing, a screen, a button zone, a 3D panel and a plurality of circuits inside the housing; wherein side and rear portions of the screen are wrapped by the housing; wherein the front portion of the monitor device is exposed outside; and the button zone includes a plurality of functional buttons that assist users to input instructions and select functions; wherein the housing is treated with a gloss finish to create a shiny housing such that a polishing value is approximately #12,000 grit.

7. The monitor device of claim 6 further comprising: a pair of 3D glasses.

8. The monitor device of claim 6 wherein the button zone is located on the bottom of the front surface of the housing and the buttons are fixed in the housing.

9. The monitor device of claim 6 wherein the button zone is located on an other part of the housing that the user can interface with.

10. The monitor device of claim 6, wherein no buttons are present in the button zone when the screen has a touch panel functionality.

11. The monitor device of claim 6 wherein the gloss finish may be anywhere on the visible part of the housing.

12. The monitor device of claim 6 wherein the screen material is selected from a group consisting of glass, polyethylene terephthalate (PET) and any other transparent material.

13. The monitor device of claim 6 wherein the monitor device is set on a vehicle seatback or a vehicle headrest and the vehicle seatback or the vehicle headrest has a containing groove which is adapted to the monitor device; wherein a protruding strip is on the containing groove and acts as a rotating axis of the monitor device; wherein the monitor device is connected with the protruding strip.

14. A monitor device wherein the monitor device is set on a vehicle seatback or a vehicle headrest and the vehicle seatback or the vehicle headrest has a containing groove which is adapted to the monitor device; wherein a protruding strip is on the containing groove and acts as a rotating axis of the monitor device; wherein the monitor device is connected with the protruding strip;
wherein the monitor device further comprising: a housing, a screen, a button zone, and a plurality of circuits inside the housing; wherein side and rear portions of the screen are wrapped by the housing: wherein the front portion of the monitor device is exposed outside; and the button zone includes a plurality of functional buttons that assists users to input instructions and select functions;

wherein the housing is treated with a gloss finish to create a shiny housing such that a polishing value is approximately #12,000 grit.

* * * * *